(12) United States Patent
Fujii

(10) Patent No.: US 7,640,126 B2
(45) Date of Patent: Dec. 29, 2009

(54) COMBINE-INFORMATION PROCESSING APPARATUS, METHOD FOR PROCESSING COMBINE-INFORMATION, PROGRAM, AND RECORDING MEDIUM

(75) Inventor: Toru Fujii, Kyoto (JP)

(73) Assignee: OMRON Corporation, Kyoto (JP)

( * ) Notice: Subject to any disclaimer, the term of this patent is extended or adjusted under 35 U.S.C. 154(b) by 71 days.

(21) Appl. No.: 12/108,153

(22) Filed: Apr. 23, 2008

(65) Prior Publication Data

US 2008/0270058 A1    Oct. 30, 2008

(30) Foreign Application Priority Data

Apr. 27, 2007   (JP) ............... 2007-119728

(51) Int. Cl.
    *G06F 19/00* (2006.01)
(52) U.S. Cl. ............................................. 702/83
(58) Field of Classification Search ........... 702/19, 702/23, 33–35, 81–85, 97, 108, 118, 182–185, 702/194, 199; 700/108–111, 121, 29, 291, 700/36, 51, 83, 99; 708/100, 422
    See application file for complete search history.

(56) References Cited

U.S. PATENT DOCUMENTS

| | | | |
|---|---|---|---|
| 6,594,620 B1 * | 7/2003 | Qin et al. ............... | 702/185 |
| 6,675,137 B1 * | 1/2004 | Toprac et al. ............ | 703/2 |
| 6,789,052 B1 * | 9/2004 | Toprac .................... | 703/2 |
| 2002/0038197 A1 * | 3/2002 | Chen et al. ............... | 702/182 |
| 2003/0045007 A1 * | 3/2003 | Tanaka et al. ............ | 438/5 |
| 2003/0199108 A1 * | 10/2003 | Tanaka et al. ........... | 438/14 |
| 2005/0125090 A1 * | 6/2005 | Sakano et al. ........... | 700/108 |
| 2006/0095232 A1 * | 5/2006 | Purdy .................... | 702/185 |
| 2007/0051470 A1 * | 3/2007 | Iwakoshi et al. ........ | 156/345.28 |
| 2007/0088534 A1 * | 4/2007 | MacArthur et al. ..... | 703/17 |
| 2007/0255442 A1 * | 11/2007 | Nakamura et al. ...... | 700/108 |
| 2008/0238699 A1 * | 10/2008 | Byrne et al. ............. | 340/632 |
| 2008/0294382 A1 * | 11/2008 | Lim et al. ............... | 702/185 |

FOREIGN PATENT DOCUMENTS

JP    2003-114713    4/2003

* cited by examiner

*Primary Examiner*—Michael P. Nghiem
*Assistant Examiner*—Cindy H Khuu
(74) *Attorney, Agent, or Firm*—William T. Ellis; Foley & Lardner LLP

(57) ABSTRACT

An inspectional equation storage unit 103 for storing an inspectional equation calculating one or more principal component scores, the inspectional equation being obtained by performing a principal component analysis on measured data on a plurality of measuring objects in terms of two or more correlated measurement items, and the measuring objects being processed by the manufacturing apparatus whose adjustable conditions are changed while the manufacturing apparatus is in a normal state; an inspected measured-data acceptance unit 104 for accepting inspected measured data on the measuring objects processed by the manufacturing apparatus in terms of the measurement items corresponding to each term contained in the inspectional equation; a principal-component-score calculation unit 105 for calculating principal component scores using the inspected measured data with the inspectional equation; an inspecting unit 106 for inspecting the manufacturing apparatus using the calculated principal component scores; and an output unit 107 for outputting the inspecting results.

12 Claims, 7 Drawing Sheets

US 7,640,126 B2

COMBINE-INFORMATION PROCESSING APPARATUS, METHOD FOR PROCESSING COMBINE-INFORMATION, PROGRAM, AND RECORDING MEDIUM

This application claims priority from Japanese Patent Application 2007-119728, filed on Apr. 27, 2007. The entire content of the aforementioned application is incorporated herein by reference.

BACKGROUND OF THE INVENTION

1. Field of the Invention

The present invention relates to a combine-information processing apparatus, a method for processing combine-information, a program and a recording medium for detecting abnormal behaviors of manufacturing apparatuses using measured values of a plurality of items and other values.

2. Description of the Related Art

In conventional methods for analyzing a cause of quality degradation of products, a known method comprises: retrieving and collecting process data; calculating residual variables and distance variables through a principal component analysis; extracting a process variable, as a candidate cause of quality degradation, having a great contribution degree by calculating the contribution degree of each process variable to the residual variable that is out of an acceptable range and comparing the calculated contribution degrees, while extracting a score variable, as a candidate cause of quality degradation, having a great contribution degree by calculating the contribution degree of each score variable to the distance variable that is out of an acceptable range and comparing the calculated contribution degrees (see, e.g., Japanese unexamined patent publication No. 2003-114713 (p. 1, FIG. 1)).

The above-described method capable of analyzing the cause of quality degradation of products is deemed to be possible for detecting abnormal behaviors of manufacturing apparatuses which are the cause of quality degradation of the products.

However, the above method has a problem in detecting the manufacturing apparatus' abnormality since if the residual variable or the like, which is calculated from measured data obtained after adjustment of settings of the manufacturing apparatus within a basically adjustable range, is out of the acceptable range, the normal manufacturing apparatus is regarded as abnormal. For example, a normal manufacturing apparatus could be determined abnormal if its settings are improperly adjusted. Consequently, the conventional method that may misjudge the manufacturing apparatus' abnormality due to a simple error in adjusting the settings of the manufacturing apparatus has difficulties being used as a method for determining that the manufacturing apparatus is abnormal.

SUMMARY OF THE INVENTION

The combine-information processing apparatus of the present invention comprises: an inspectional equation storage unit in which an inspectional equation for calculating one or more principal component scores can be stored, the inspectional equation being obtained by performing a principal component analysis on normal measured data that is measured data regarding a plurality of measuring objects in terms of two or more correlated measurement items, and the plurality of measuring objects being processed by a manufacturing apparatus whose adjustable conditions are changed while the manufacturing apparatus is in a normal state; an inspected measured-data acceptance unit for accepting inspected measured data that is measured data regarding the measuring objects processed by the manufacturing apparatus in terms of the measurement items corresponding to each term contained in the inspectional equation; a principal-component-score calculation unit for calculating the principal component scores using the inspected measured data, accepted by the inspected measured-data acceptance unit, with the inspectional equation; an inspecting unit for inspecting the state of the manufacturing apparatus using the principal component scores calculated by the principal-component-score calculation unit; and an output unit for outputting inspecting results obtained by the inspecting unit.

According to the configuration, variations in measured data are inspected using the principal component scores contributed less by variations caused by the adjustment made to the manufacturing apparatus, and therefore the manufacturing apparatus can be properly determined whether abnormal or not with consideration given to the measured data variations or the like at the adjustment of the manufacturing apparatus, that is, by eliminating the effect of the variations caused by the adjustment.

In the combine-information processing apparatus according to the present invention, the inspecting unit determines that the manufacturing apparatus is abnormal when the principal component scores calculated by the principal-component-score calculation unit are greater than a predetermined threshold, and the output unit outputs inspecting results indicating the manufacturing apparatus' abnormality determined by the inspecting unit.

According to the configuration, the manufacturing apparatus can be properly determined whether abnormal or not with consideration given to the measured data variations or the like caused by the adjustment made to the manufacturing apparatus. Especially, the occurrence of abnormal behaviors can be properly determined when the cause of abnormality affects any of the correlated measured data.

In the combine-information processing apparatus according to the present invention, the inspected measured-data acceptance unit accepts a plurality of inspected measured data blocks obtained by measuring a plurality of measuring objects, the principal-component-score calculation unit calculates a plurality of principal component scores associated with the plurality of inspected measured data blocks using the plurality of inspected measured data blocks accepted by the inspected measured-data acceptance unit with the inspectional equation, the inspecting unit calculates a statistic of the plurality of principal component scores calculated by the principal-component-score calculation unit and determines that the manufacturing apparatus is abnormal by comparing the calculated statistic and a predetermined threshold, and the output unit outputs inspecting results indicating the manufacturing apparatus' abnormality determined by the inspecting unit.

According to the configuration, the manufacturing apparatus can be properly determined whether abnormal or not with consideration given to the measured data variations or the like caused by the adjustment made to the manufacturing apparatus.

In the combine-information processing apparatus according to the present invention, the inspected measured-data acceptance unit accepts a plurality of inspected measured data blocks obtained by measuring a plurality of measuring objects, the principal-component-score calculation unit calculates a plurality of principal component scores associated with the plurality of inspected measured data blocks using the plurality of inspected measured data blocks accepted by the inspected measured-data acceptance unit with the inspectional equation, the inspecting unit determines that the manufacturing apparatus is abnormal when a representative value of the plurality of principal component scores calculated by the principal-component-score calculation unit is greater than a predetermined threshold, and the output unit outputs inspecting results indicating the manufacturing apparatus' abnormality determined by the inspecting unit.

According to the configuration, transient abnormality can be ignored, thereby realizing high-accurate and disturbance-resistant abnormal detection.

In the combine-information processing apparatus according to the present invention, the inspected measured-data acceptance unit accepts a plurality of inspected measured data blocks obtained by measuring a plurality of measuring objects, the principal-component-score calculation unit calculates a plurality of principal component scores associated with the plurality of inspected measured data blocks using the plurality of inspected measured data blocks accepted by the inspected measured-data acceptance unit with the inspectional equation, the inspecting unit determines that the manufacturing apparatus is abnormal when a value of dispersion of the plurality of principal component scores calculated by the principal-component-score calculation unit is greater than a predetermined threshold, and the output unit outputs inspecting results indicating the manufacturing apparatus' abnormality determined by the inspecting unit.

According to the configuration, the manufacturing apparatus can be properly determined whether abnormal or not with consideration given to the measured data variations or the like caused by the adjustment to the manufacturing apparatus. Especially, the occurrence of abnormal behaviors can be properly determined when the cause of abnormality affects even a part of the correlated measured data.

The combine-information processing apparatus according to the present invention further comprises: a normal measured-data acceptance unit for accepting normal measured data that is measured data regarding a plurality of measuring objects in terms of two or more correlated measurement items, and the plurality of measuring objects being processed by a manufacturing apparatus whose adjustable conditions are changed while the manufacturing apparatus is in a normal state; and an inspectional equation acquisition unit for acquiring an inspectional equation for calculating one or more principal component scores and storing the inspectional equation in the inspectional equation storage unit, and the inspectional equation being obtained by performing a principal component analysis on the normal measured data accepted by the normal measured-data acceptance unit.

According to the configuration, the manufacturing apparatus can be determined whether abnormal or not by constructing and using the inspectional equation.

In the combine-information processing apparatus according to the present invention, among expressions that calculate the principal component scores and are obtained by performing a principal component analysis on the normal measured data, the inspectional equation that can be stored in the inspectional equation storage unit is an inspectional equation for calculating the principal component scores in the ascending order of contribution ratio.

According to the configuration, variations in measured data are inspected using the principal component scores contributed less by variations caused by the adjustment made to the manufacturing apparatus, and therefore the manufacturing apparatus can be properly determined whether abnormal or not with consideration given to the measured data variations or the like at the adjustment to the manufacturing apparatus.

In the combine-information processing apparatus according to the present invention, among expressions that calculate the principal component scores and are obtained by performing a principal component analysis on the normal measured data, the inspectional equation that can be stored in the inspectional equation storage unit at least includes an expression for calculating the principal component scores of a principal component having the lowest contribution ratio.

According to the configuration, variations in measured data are inspected using the principal component scores contributed less by variations caused by the adjustment made to the manufacturing apparatus, and therefore the manufacturing apparatus can be properly determined whether abnormal or not with consideration given to the measured data variations or the like at the adjustment to the manufacturing apparatus.

In the combine-information processing apparatus according to the present invention, when the magnitude of coefficients in each term contained in the expression for calculating the principal component scores obtained through the principal component analysis is smaller than a predetermined threshold, the inspectional equation that can be stored in the inspectional equation storage unit is an expression for calculating principal component scores with its coefficients set to 0.

According to the configuration, the number of terms, of the inspectional equation, less contributing to the abnormality determination can be reduced, thereby increasing processing speed and constructing an inspectional equation resistant to disturbance.

With the combine-information processing apparatus, the manufacturing apparatus can be properly determined whether abnormal or not with consideration given to the measured data variations or the like caused by the adjustment made to the manufacturing apparatus.

DETAILED DESCRIPTION OF THE PREFERRED EMBODIMENT

With reference to the drawings, an embodiment of the combine-information processing apparatus and a method, program and recording medium related thereto will be described below. The elements marked with the same reference numbers in the embodiment are operationally the same, and therefore their descriptions may not be reiterated.

Embodiments

Figure 1:
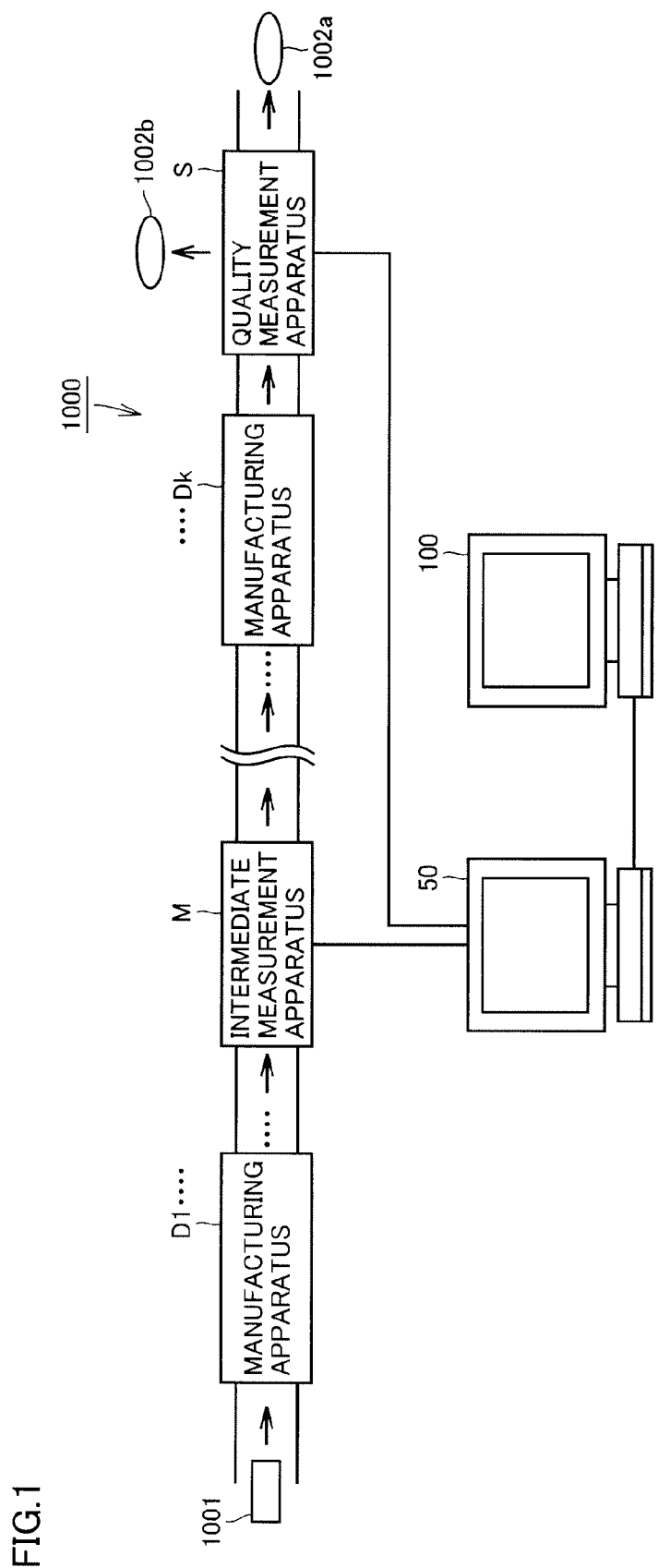
FIG. 1 is a conceptual drawing illustrating a schematic configuration of a production system of an embodiment.

FIG. 1 is a conceptual drawing illustrating a schematic configuration of a production system of the embodiment. The production system is comprised of a production line 1000, a measured-data collection apparatus 50 and a combine-information processing apparatus 100. In this embodiment, they are connected via communication lines or the like so as to communicate with each other. Note that the measured-data collection apparatus 50 can be incorporated in the production line 1000 or the combine-information processing apparatus 100.

Figure 2:
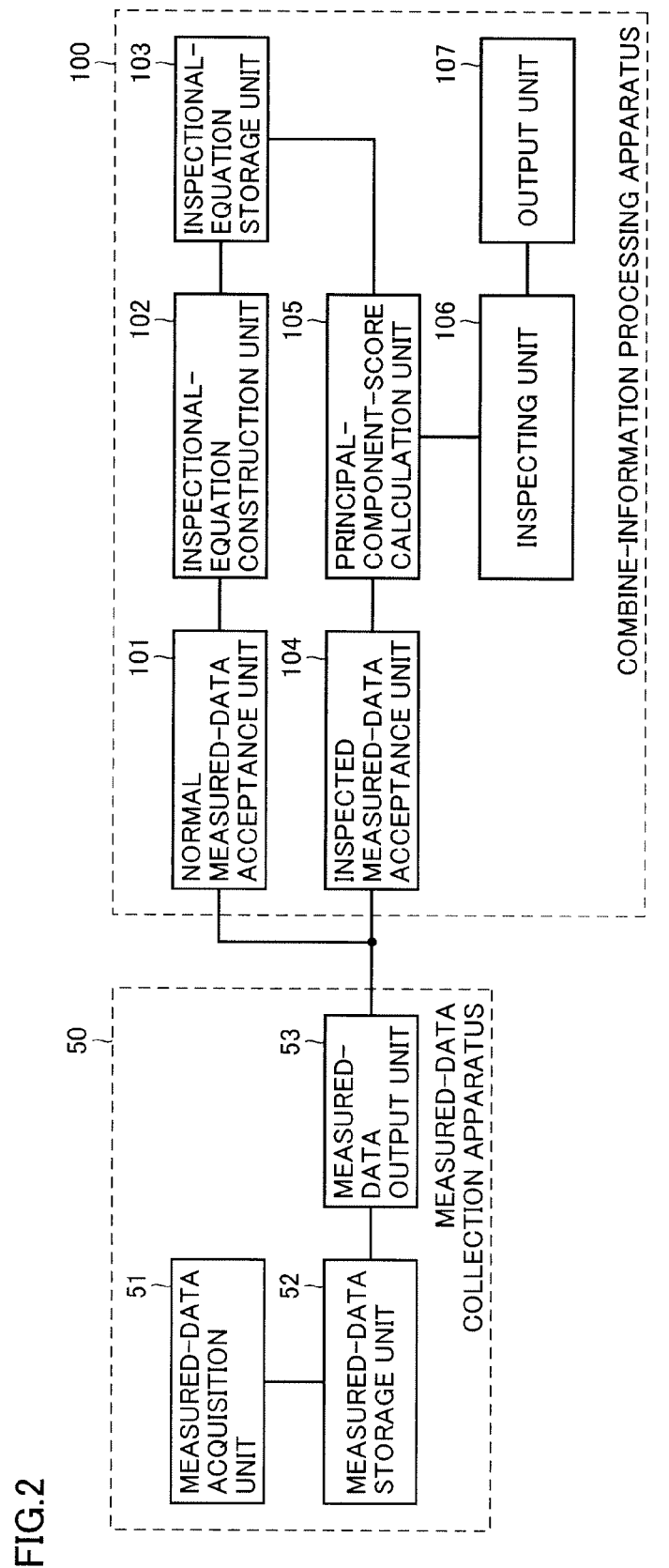
FIG. 2 is a block diagram of a combine-information processing apparatus.

FIG. 2 is a block diagram of the measured-data collection apparatus 50 and the combine-information processing apparatus 100 of the embodiment.

In the production line 1000, electrical apparatuses, machinery or other types of products are manufactured with one or more parts 1001. Products are specifically defined herein as deliverables obtained from the production line 1000. The products include component parts used in other apparatuses.

The production line 1000 includes manufacturing apparatuses D1 to Dk (k is an integer of 1 or more), an intermediate measurement apparatus M and a quality measurement apparatus S.

The manufacturing apparatuses D1 to Dk are equipment for manufacturing electrical apparatuses, machinery or other types of products or parts, and can have any types of structures and manufacture any articles. For example, the manufacturing apparatuses D1 to Dk execute various processing operations, such as treatment, machining and assembly, to the parts 1001 or half-finished products, which are delivered by a conveyer belt or other transfer systems according to predetermined steps. For the sake of clear explanation, objects subjected to the screening process by the quality measurement apparatus S are referred to as "products", while unfinished parts and half-finished products are referred to as "intermediate products". The processing operations and manufacturing conditions of the manufacturing apparatuses D1 to Dk can be set by instructions fed through an acceptance unit (not shown) from on-site operators. For example, changes made to the processing conditions, such as bending, pressure, temperature, can provide a product quality adjustment including shapes and dimensions of the product and operating characteristics. The "quality" described herein is a concept including the product characteristics. The manufacturing apparatuses D1 to Dk are generally different types of apparatuses performing different operations, but may be the same type of apparatuses performing the same operation.

The intermediate measurement apparatus M measures a plurality of intermediate products in the production line 1000 in terms of one or more measurement items to obtain the measured data. The measured data on the one or more measurement items of the plurality of intermediate products obtained by the intermediate measurement apparatus M is herein referred to as "intermediate measured data". The intermediate measurement apparatus M takes a measurement of the intermediate products between any two manufacturing apparatuses out of the plurality of manufacturing apparatuses D1 to Dk. Although, in this embodiment, the intermediate measurement apparatus M is disposed immediately after manufacturing apparatus D1 for the sake of explanation, the intermediate measurement apparatus M can be arranged immediately after any of the manufacturing apparatuses D1 to Dk−1. The intermediate measurement apparatus M can take a measurement of either intermediate product flowing in the production line 1000 or intermediate product taken out of the production line 1000. The "measurement items" are items to be measured, including the shape, dimensions, operating characteristics or the like of the transferred intermediate products. Out of these measurement items, one or more measurement items of each intermediate product are measured by the intermediate measurement apparatus M. Then, the intermediate measured data, which is measured data obtained as a measurement result, is output, for instance, transmitted to the measured-data collection apparatus 50. The intermediate measurement apparatus M preferably outputs, in addition to the intermediate measured data on one or more measurement items, information regarding the measurement time, information indicating that the measured data is intermediate measured data obtained by the intermediate measurement apparatus M, information regarding the counted number of the intermediate products measured by the intermediate measurement apparatus M from a predetermined time such as the starting time of production operation, identification information on the intermediate product to be measured, identification information on the measurement items to indicate what measurement item the measured data contains and so on in an appropriate manner. The added information can help determine from the measured data: what measured data is associated with what intermediate product or product; what time the measured data is obtained; and what measurement item the measurement result refers to. The information regarding time can be obtained from a clock (not shown), for example. The number of the intermediate products can be counted by incrementing a counter every time the intermediate measurement apparatus M takes a measurement. The identification information on the intermediate product can be obtained by reading out a previously given IC tag, bar code or other identifications on the intermediate product with a reader. The information regarding the measurement items can be obtained by previously assigning identification information to every measurement device such as a sensor and obtaining the identification information with the measurement data measured by the sensor. The intermediate measurement apparatus M is comprised of a sensor, an MPU, a memory and some other components and can include transmitting means.

The quality measurement apparatus S measures a plurality of finished products (hereinafter referred to as "products"), which are manufactured by the plurality of manufacturing apparatuses D1 to Dk making up the production line 1000, in terms of one or more measurement items to obtain measured data that is used to sort the plurality of products manufactured through the manufacturing processes. The measured data, which is obtained by the quality measurement apparatus S to be used for screening, is referred to as "screening measured data". The "screening" described herein is performed to sort out, for example, conforming products and defective products. In this embodiment, the plurality of measurement items to be measured by the intermediate measurement apparatus M are supposed to include some correlated measurement items, while the plurality of measurement items to be measured by the quality measurement apparatus S are supposed to include some correlated measurement items. The correlated measurement items may be, for example, current and resistance, spring's bending amount, force and push distance and so on. In addition, correlation is also established between the measurement items measured by the intermediate measurement apparatus M and the measurement items, which are the same or corresponding to the measurement items by the intermediate measurement apparatus M, measured by the quality measurement apparatus S. Note that even if the measurement items of the intermediate measurement apparatus M and the measurement items of the quality measurement apparatus S are the same, they are regarded as different since they are measured at a different time. For example, resistance, which is one of the measurement items measured by the intermediate measurement apparatus M, in a first area of an intermediate product is regarded as correlated but different from resistance, which is one of the measurement items measured by the quality measurement apparatus S, in the area of the finished product (the same area as the first area of the intermediate product). The quality measurement apparatus S can take a measurement of either product flowing in the production line 1000 or product taken out from the production line 1000. As with the case of the above-described intermediate measurement apparatus M, the quality measurement apparatus S obtains and outputs the measured data, time information associated with the measured data, the counted number of the products measured by the quality measurement apparatus S from a predetermined time such as the starting time of production operation, identification information on the quality measurement apparatus S and other information. The configurations of the information are the same as the case of the intermediate measurement apparatus M and therefore their descriptions will be omitted. Furthermore, the quality measurement apparatus S can be designed to output information indicating that the measured data is screening measured data with the measured data associated therewith. The quality measurement apparatus S can screen products by reading out a specification value associated with one or more measurement items previously stored in a recording medium such as memory (not shown), determining whether the measured data on each measurement item of each product is in a range set by the specification value, and determining according to the determination result whether the product satisfies the desired quality requirement, for example, whether the product is a conforming product. After the determination, if the product is a conforming product, the product can be carried away as a conforming product 1002*a*, and if the product is not a conforming product, the product can be removed as a defective product 1002*b*. Note that the function of screening the products using the screening measured data and the function of screening out the defective product 1002*b* can be installed into the quality measurement apparatus S or can be added to a separate apparatus from the quality measurement apparatus S. The quality measurement apparatus S is comprised of a sensor, an MPU, a memory and some other components and can include transmitting means.

The measured-data collection apparatus 50 collects various kinds of measured data obtained in the production line 1000.

The measured-data collection apparatus 50 comprises a measured-data acquisition unit 51, a measured-data storage unit 52 and a measured-data output unit 53.

The measured-data acquisition unit 51 directly or indirectly acquires measured data on two or more correlated measurement items out of the intermediate measured data regarding the intermediate product and the screening measured data regarding the product measured by the intermediate measurement apparatus M and quality measurement apparatus S, respectively, in the production line 1000. The measured-data acquisition unit 51 can receive the intermediate measured data and screening measured data on two or more measurement items transmitted from the intermediate measurement apparatus M and quality measurement apparatus S, respectively, in the production line 1000, or can read out the intermediate measured data and screening measured data stored in a recording medium, such as a hard disk and memory, by the intermediate measurement apparatus M and quality measurement apparatus S. The method in which measured-data acquisition unit 51 obtains the intermediate measured data and screening measured data is not limited. The intermediate measured data and screening measured data acquired by the measured-data acquisition unit 51 are accumulated in a measured-data storage unit 52 or other storage media, which will be described later. The measured-data acquisition unit 51 can acquire the time information, information on the counted number of the intermediate products and products, identification information of the intermediate products and products and other information and output the information with measured data associated therewith. The measured-data acquisition unit 51 that obtained the time information, identification information of the intermediate products and products and other information, each associated with the intermediate measured data and screening measured data, preferably stores the information with the associated measured data in the measured-data storage unit 52 or other storage units. Identification information of an intermediate product and identification information of a product that is the finished intermediate product are generally identical. In addition, the measured-data acquisition unit 51 that failed to obtain the identification information on the intermediate products and products can successively calculate averages of the acquired intermediate measured data and screening measured data, each grouped by a certain period of time and store the representative value (average value) as new intermediate measured data and screening measured data. Instead of the average value, other representative values such as a median value can be also used. The measured-data acquisition unit 51 can be embodied with an MPU, a memory and some other components, or with a wireless or a wired reception means. The processing performed by the measured-data acquisition unit 51 is generally provided by software that is recorded on a recording medium, such as a ROM, but may also be provided by hardware (a special circuit).

The measured-data storage unit 52 stores the intermediate measured data and screening measured data on two or more correlated measurement items acquired by the measured-data acquisition unit 51. The time information and identification information of the intermediate products and products acquired by the measured-data acquisition unit 51 can be also stored with the intermediate measured data and screening measured data associated therewith. For example, the measured-data storage unit 52 can store the intermediate measured data and screening measured data and time information or other information associated therewith in the same record of a data base. Note that the measured-data storage unit 52 may be physically separated recording media so that the intermediate measured data and screening measured data are stored separately in the recording media. A nonvolatile recording medium is appropriate for the measured-data storage unit 52; however, a volatile recording medium can also be employed.

The measured-data output unit 53 outputs the intermediate measured data and screening measured data on two or more correlated measurement items stored in the measured-data storage unit 52. The "output" described herein is a concept including, for example, transmission of the intermediate measured data and screening measured data to the combine-information processing apparatus 100 and accumulation of the intermediate measured data and screening measured data in a removable recording medium such as a CD and flash memory. The timing or trigger by which the measured-data output unit 53 actuates the data output is not limited. For example, the measured-data output unit 53 can be designed to output the intermediate measured data and screening measured data upon receipt of an instruction to output the intermediate measured data and screening measured data through a reception unit (not shown). Alternatively, initiation of information processing by the combine-information processing apparatus 100 can trigger output of the intermediate measured data and screening measured data. The measured-data output unit 53 may or may not include a communication device and recording device. Driver software for an output device or driver software for an output device and an output device may be employed to provide the measured-data output unit 53.

The combine-information processing apparatus 100 comprises a normal measured-data acceptance unit 101, an inspectional equation acquisition unit 102, an inspectional equation storage unit 103, an inspected measured-data acceptance unit 104, a principal-component-score calculation unit 105, an inspecting unit 106 and an output unit 107.

The normal measured-data acceptance unit 101 accepts normal measured data, which is measured data, in terms of two or more correlated measurement items, on a plurality of measuring objects processed by the manufacturing apparatuses whose adjustable conditions are changed while the manufacturing apparatuses are in a normal state. The "measuring object" is an object to be measured by the intermediate measurement apparatus M and quality measurement apparatus S, more specifically, it is a product or intermediate product processed, i.e., manufactured, treated or machined, by the manufacturing apparatuses D1 to Dk in the production line 1000. In this embodiment, the plurality of measuring objects are assumed to be objects processed and obtained by the manufacturing apparatuses D1 to Dk whose adjustable conditions are changed within an adjustable range so as to be different from each other while the manufacturing apparatuses D1 to Dk are in a normal state. The conditions under which each measuring object is processed are preferably adjusted so that the difference between the values of the adjusted condition items are as great as possible, the maximum changes are made within the adjustable range, and the adjusted condition items are combined in various ways. The most extensive changes are preferably made to the adjustable settings of each of the manufacturing apparatuses D1 to Dk. In this example, the measured data on two or more measurement items accepted by the normal measured-data acceptance unit 101 is measured data on at least two correlated measurement items out of the measured data on one or more measurement items measured by the intermediate measurement apparatus M and the measured data on one or more measurement items measured by the quality measurement apparatus S. The measured data may be, for example, either measured data on two or more correlated measurement items measured by the intermediate measurement apparatus M, or the measured data on two or more correlated measurement items measured by the quality measurement apparatus S. In this embodiment, a description is made especially for the case where the measured data on two or more measurement items accepted by the normal measured-data acceptance unit 101 is a plurality of measured data blocks including at least measured data on one or more measurement items measured by the intermediate measurement apparatus M and at least measured data on one or more measurement items measured by the quality measurement apparatus S. The two or more measurement items need to be correlated with each other. The two or more correlated measurement items may be, for example, a combination of correlated but different measurement items, such as a combination of a measurement item of current and a measurement item of resistance as described above, or a combination of the same measurement items measured by the intermediate measurement apparatus M and quality measurement apparatus S, that is, a combination of identical or corresponding measurement items measured in a pre-process and post-process in the manufacturing processes. The normal measured-data acceptance unit 101 generally accepts a plurality of measured data blocks in terms of the respective measurement items. The timing or order in which the normal measured-data acceptance unit 101 accepts the plurality of measured data blocks is not limited. The "acceptance" described herein includes, for example, acceptance from input means, reception of input signals transmitted from other devices, and reading out of information from a recording medium or the like. As an example, the normal measured-data acceptance unit 101 receives measured data transmitted from the measured-data output unit 53 as normal measured data in this embodiment. The input means can be any input means including a numeric keypad, a keyboard, a mouse and a menu screen. A device driver of input means, such as a numeric keypad and keyboard, control software over menu screens, communication means or a device driver of communication means may be employed to provide the normal measured-data acceptance unit 101.

The inspectional-equation construction unit 102 acquires an inspectional equation for calculating principal component scores in terms of one or more principal components by performing a principal component analysis on the normal measured data accepted by the normal measured-data acceptance unit 101. Then, the inspectional equations are accumulated in the inspectional equation storage unit 103, which will be described later. Specifically, a correlation matrix between the measurement items is calculated using the normal measured data on the plurality of measurement items. A principal component analysis performed with the correlation matrix provides an expression for calculating principal component scores of a principal component. It is desired to previously standardize the normal measured data to be used in the above process using an average value and standard deviation of the data in terms of the same measurement items to smooth out discrepancies in the variation range of the measurement items and the discrepancies in the absolute values changeable depending on their unit.

The same number of expressions for calculating the principal component and principal component score is obtained as the number of the measurement items; however, the principal component analysis that is a technique of compressing data does not require the same number of the principal components as the measurement items. In addition, since the manufacturing apparatuses D1 to Dk in this embodiment are inspected for their abnormal behaviors after influences derived from adjustments made to the manufacturing apparatuses D1 to Dk are eliminated, many expressions for calculating the principal component scores of the principal components having high ratios in which the influences derived from the adjustments made to the manufacturing apparatuses D1 to Dk contribute to the principal components, out of the principal components, are often not appropriate as an inspectional equation. In this embodiment in which the principal component is calculated using the normal measured data obtained after the adjustable conditions of the manufacturing apparatuses D1 to Dk are changed, it is regarded that the principal component having higher contribution ratios is a principal component influenced by the adjustment made to the manufacturing apparatuses D1 to Dk, and the principal component having the highest contribution ratio is a principal component in the direction where the dispersion caused by the adjustment factor of the manufacturing apparatuses D1 to Dk is most widely extended.

Accordingly, out of the resultant principal components obtained through the principal component analysis performed on the normal measured data, the expression for calculating the principal component scores of the principal components having low contribution ratios is acquired as an inspectional equation in the embodiment. Particularly, the expression for calculating the principal component scores of at least one part of the principal components except the principal components having the highest contribution ratio is acquired as an inspectional equation. The inspectional equations acquired by the inspectional-equation construction unit 102 preferably at least include expressions for calculating the principal component scores of the principal components having the lowest contribution ratio. Alternatively, the inspectional-equation construction unit 102 can obtain expressions for calculating the principal component scores using the normal measured data in ascending order of the contribution ratio.

Concrete examples of how the inspectional-equation construction unit 102 acquires the inspectional equation will be cited. After an effective upper limit of the contribution ratio is determined as a threshold, the expression for calculating principal component scores of principal components having a contribution ratio lower than the threshold is acquired as an inspectional equation. Alternatively, a cumulative contribution ratio is obtained successively using principal components in ascending order. When the cumulative contribution ratio reaches a predetermined value, the expression for calculating a principal component score of each of the principal components used to obtain the cumulative contribution ratio is acquired as an inspectional equation. In this description, the inspectional-equation construction unit 102 calculates the contribution ratio of the principal component. The contribution ratio of each principal component is calculated using an eigenvalue. The eigenvalue is calculated with an eigenvector using a correlation coefficient matrix. The process of calculating the contribution ratio of each principal component is well-known and therefore its description will be omitted.

An expression for calculating a principal component score for each principal component is expressed with terms containing variables, each of which is a value of each measurement item. If a coefficient in each term contained in an expression for calculating a principal component score obtained through a principal component analysis is smaller than a predetermined threshold, an acquired inspectional equation may be an expression for calculating the principal component score with the coefficient set to 0, in other words, an expression for calculating the principal component score with the term containing the coefficient removed. This can avoid the use of measured data on the measurement item that contributes less to abnormality determination, which will be described later, thereby improving processing speed while constructing inspectional equations resistant to disturbance. The process for calculating the correlation matrix, standardization process and process for performing the principal component analysis are well-known techniques and therefore their detailed descriptions will be omitted. The inspectional-equation construction unit 102 can be generally embodied with an MPU, a memory and some other components. The processing performed by the inspectional-equation construction unit 102 is generally provided by software that is recorded on a recording medium, such as a ROM, but may also be provided by hardware (a special circuit).

The inspectional equation storage unit 103 stores an inspectional equation for calculating one or more principal component scores of principal components that are obtained by performing a principal component analysis on the normal measured data. The normal measured data is measured data on two or more correlated measurement items of a plurality of measuring objects processed by manufacturing apparatuses whose adjustable conditions are changed while the manufacturing apparatuses are in a normal state. Specifically, the inspectional equation accumulated in the inspectional equation storage unit 103 is the same as the inspectional equation acquired by the above-mentioned inspectional-equation construction unit 102. In this description of the embodiment, the inspectional equation acquired by the inspectional-equation construction unit 102 is accumulated by the inspectional-equation construction unit 102 into the inspectional equation storage unit 103, but the process of accumulating the same inspectional equations as above in the inspectional equation storage unit 103 is not limited. For example, an inspectional equation obtained by an apparatus outside the combine-information processing apparatus 100 through the same process as that performed by the inspectional-equation construction unit 102 using the normal measured data can be accepted by an acceptance unit (not shown) to be accumulated in the inspectional equation storage unit 103. Alternatively, an inspectional equation externally prepared in the same manner and stored in a memory or other storage can be read out by a reading unit (not shown) to be accumulated in the inspectional equation storage unit 103. A nonvolatile recording medium is appropriate for the inspectional equation storage unit 103; however, a volatile recording medium can also be employed.

The inspected measured-data acceptance unit 104 accepts inspected measured data that is measured data of measuring objects processed by the manufacturing apparatuses in terms of the measurement items corresponding to terms contained in an inspectional equation stored in the inspectional equation storage unit 103. The inspected measured data is measured data measured in the production line 1000 and measured data to be inspected for detecting abnormal behaviors of the manufacturing apparatuses in the production line 1000. The measurement items corresponding to each term contained in the inspectional equation are in agreement with the measurement items of the normal measured data if the terms obtained through a principal component analysis are not removed according to the magnitude of the coefficients upon construction of the inspectional equation; however, if some of the terms are deleted, the measured data on the measurement items corresponding to the measurement items, corresponding to the deleted terms, of the normal measured data is not required. The inspected measured-data acceptance unit 104 generally accepts a plurality of inspected measured data blocks obtained by measuring a plurality of measuring objects. The "acceptance" described herein includes, for example, acceptance from input means, reception of input signals transmitted from other apparatuses, reading out information on a recording medium. The input means can be any input device including a numeric keypad, a keyboard, a mouse, and a menu screen. In this description, the measured data transmitted from the measured-data output unit 53 is received as inspected measured data as an example. The inspected measured-data acceptance unit 104 can accept the inspected measured data at any timing and in any order. For example, the inspected measured-data acceptance unit 104 can receive the inspected measured data transmitted one by one from the measured-data output unit 53, or can output an instruction to send a group of the inspected measured data blocks stored in the measured-data storage unit 52 to the measured-data collection apparatus 50 so as to receive the inspected measured data at once transmitted in response to the output instruction. The inspected measured-data acceptance unit 104 may be a device driver of input means such as a numeric keypad and keyboard, control software for a menu screen, communication means, or a device driver of communication means.

The principal-component-score calculation unit 105 calculates a principal component score using the inspected measured data accepted by the inspected measured-data acceptance unit 104 with one or more inspectional equations stored in the inspectional equation storage unit 103. When the inspected measured-data acceptance unit 104 accepts multiple sets of inspected measured data associated with each measurement item, the principal-component-score calculation unit 105 calculates a plurality of principal component scores associated with the multiple sets of inspected measured data using the multiple sets of inspected measured data with one or more inspectional equations stored in the inspectional equation storage unit 103. In a case where the normal measured data is standardized to obtain the inspectional equations, the inspected measured data to be assigned to each inspectional equation also needs to be previously normalized. The principal-component-score calculation unit 105 may be generally embodied with an MPU, a memory and other components. The processing performed by the principal-component-score calculation unit 105 is generally provided by software that is recorded on a recording medium, such as a ROM, but may be also provided by hardware (a special circuit).

The inspecting unit 106 inspects the state of the manufacturing apparatuses by using the principal component scores calculated by the principal-component-score calculation unit 105 with the inspectional equations. The "inspecting" described herein means, for example, determination of whether abnormal behaviors occur in the manufacturing apparatuses. The purpose of inspecting the state of the manufacturing apparatuses is to allow users eventually to recognize the abnormal behaviors in the manufacturing apparatuses, and therefore constructing output data in a recognizable form of abnormality, such as a graph, is also regarded as the "inspecting". The "abnormality" described herein denotes, for example, a state of the manufacturing apparatus that cannot manufacture proper products even after its setting is adjusted in an adjustable range. The inspecting unit 106 can inspect the manufacturing apparatuses in any methods with the principal component scores calculated by the principal-component-score calculation unit 105. In one of the exemplary methods, the inspecting unit 106 determines that the manufacturing apparatus is abnormal when the value of the principal component score calculated by the principal-component-score calculation unit 105, or an absolute value of the value is higher than a predetermined threshold. Alternatively, in a case where the inspected measured-data acceptance unit 104 accepts a plurality of inspected measured data blocks on a plurality of measuring objects, the inspecting unit 106 can calculate a statistic of a plurality of principal component scores calculated using the plurality of inspected measured data blocks by the principal-component-score calculation unit 105, and compare the calculated statistic and the predetermined threshold to determine whether the manufacturing apparatus is abnormal. This statistic is, for example, a representative value of the plurality of principal component scores calculated by the principal-component-score calculation unit 105, or a value indicating dispersion of the principal component scores calculated by the principal-component-score calculation unit 105. The representative value is, for example, an average or median. The value indicating dispersion may be, for example, a value of variance or standard deviation. Specifically, the inspecting unit 106 is adapted to determine that the manufacturing apparatus is abnormal when the representative value of the principal component scores calculated by the principal-component-score calculation unit 105 is higher than the predetermined threshold. Alternatively, the inspecting unit 106 can be adapted to determine that the manufacturing apparatus is abnormal when a value indicating dispersion of the principal component scores calculated by the principal-component-score calculation unit, or a variance, is higher than the predetermined threshold. The threshold is set based on, for example, data obtained from experimental results, past measurement data and data on the situation in which abnormal behaviors occurred in the manufacturing apparatuses. The inspecting unit 106 is generally embodied with an MPU, a memory and other components. The processing performed by the inspecting unit 106 is generally provided by software that is recorded on a recording medium such as a ROM, but can be also provided by hardware (a special circuit).

The output unit 107 outputs results obtained by the inspecting unit 106, for example, outputs inspecting results indicating that the manufacturing apparatus is abnormal, which is determined by that inspecting unit 106. The output unit 107 can output the inspecting results in the form of a graph or the like. The "output" described herein includes display on a screen, a printed output on paper by printers, a sound output such as a buzzer, lighting of warning lights, transmission to external devices and so on. The output unit 107 may include or may not include an output device such as a display and a printer. Driver software for an output device or driver software for an output device and an output device may be employed to provide the output unit 107.

Next description will be made about operation of the production system. First, one exemplary operation of the production line 1000 will be described. Each of manufacturing apparatuses D1 to Dk conducts a predetermined process, such as treatment, machining and assembly, along a predetermined order on a plurality of parts or half-finished products carried on a conveyor belt, for example, to manufacture products. An intermediate measurement apparatus M measures measuring objects, which are intermediate products processed by given manufacturing apparatuses D1 to Dk−1, in terms of one or more predetermined measurement items in order to acquire intermediate measured data. Time information and other information are also appropriately acquired upon the measurement operation. Then the intermediate measurement apparatus M outputs or transmits the intermediate measured data obtained by the measurement together with the other information. A quality measurement apparatus S measures measuring objects, which are products completed by a final manufacturing apparatus Dk, in terms of one or more measurement items correlated with the measurement items measured by the intermediate measurement apparatus M in order to acquire screening measured data. The time information and other information are also appropriately acquired upon the measurement operation. The quality measurement apparatus S outputs or transmits the screening measured data obtained by the measurement the intermediate measured data obtained by the measurement together with the other information.

First of all, in the production line 1000, the manufacturing apparatuses D1 to Dk−1 manufacture a plurality of products with their adjustable conditions changed in an adjustable range while the manufacturing apparatuses D1 to Dk are in a normal state for the purpose of acquiring inspectional equations. Then, intermediate measured data and screening measured data, which are normal measured data obtained during the manufacturing process, are acquired by the intermediate measurement apparatus M and quality measurement apparatus S, respectively. After acquisition of the inspectional equations, the manufacturing apparatuses D1 to Dk ordinarily manufacture products, while intermediate measured data and screening measured data, which are inspected measured data obtained during the regular manufacturing process, are acquired by the intermediate measurement apparatus M and quality measurement apparatus S, respectively.

Next, one exemplary operation of the measured-data collection apparatus 50 will be described. The measured-data acquisition unit 51 repeatedly determines whether it has received the intermediate measured data and screening measured data output by the intermediate measurement apparatus M and quality measurement apparatus S. If received, the measured-data acquisition unit 51 stores the received intermediate measured data and screening measured data in the measured-data storage unit 52. Then, the time information associated with the intermediate measured data and screening measured data and information identifying the intermediate measured data and screening measured data are also received and stored as associated with the intermediate measured data and screening measured data. Subsequently, the process of determining whether the intermediate measured data and screening measured data have been received is again performed. Then, the intermediate measured data and screening measured data stored in the measured-data storage unit 52 are output at a desired timing or by a desired trigger from the measured-data output unit 53. For example, an instruction to output the intermediate measured data and screening measured data transmitted from an external device and received through a reception unit (not shown) causes the measured-data output unit 53 to transmit the measured data to the combine-information processing apparatus 100. These processes are terminated by turning off the power source or interruption causing termination of the processes.

Next, the operation of the combine-information processing apparatus 100 will be described by referring to a flow chart in FIG. 3. For the sake of simplifying the description, it is defined that a plurality of normal measured data blocks and a plurality of inspected measured data blocks are stored in the measured-data storage unit 52 of the measured-data collection apparatus 50, and the normal measured data and inspected measured data stored in the measured-data storage unit 52 are transmitted from the measured-data output unit 53.

(Step S301) The normal measured-data acceptance unit 101 accepts a plurality of normal measured data blocks. For example, the normal measured-data acceptance unit 101 accepts one or more sets of the normal measured data, which are associated with the correlated measurement items, transmitted from the measured-data collection apparatus 50. The normal measured-data acceptance unit 101 can accept a group of normal measured data blocks at once or can accept a normal measured data block one-by-one in sequence. The accepted normal measured data is accumulated in, for example, a memory (not shown).

(Step S302) The inspectional-equation construction unit 102 performs a principal component analysis on the normal measured data accepted by the normal measured-data acceptance unit 101 to acquire one or more inspectional equations. If needed, the normal measured data can be standardized prior to the principal component analysis.

(Step S303) The inspectional-equation construction unit 102 stores the one or more acquired inspectional equations in the inspectional equation storage unit 103.

(Step S304) The inspected measured-data acceptance unit 104 determines whether it has accepted the inspected measured data, which is transmitted from the measured-data collection apparatus 50, regarding the measurement items corresponding to terms contained in the inspectional equation. In this embodiment, the inspected measured-data acceptance unit 104 determines whether it has accepted one set of the inspected measured data regarding the measurement items corresponding to the terms in the inspectional equation; however, the inspected measured-data acceptance unit 104 can be adapted to determine whether it has accepted predetermined multiple sets of the inspected measured data. The accepted inspected measured data is temporarily stored in a memory (not shown) or the like. If the inspected measured data has been accepted, the process goes to step S305; otherwise the process goes to step S308.

(Step S305) The principal-component-score calculation unit 105 reads out an inspectional equation accumulated in the inspectional equation storage unit 103 in step S303 and calculates a principal component score by assigning the set of inspected measured data received in step S304 to the inspectional equation. If needed, the inspected measured data can be standardized prior to the assignment to the inspectional equation.

(Step S306) The inspecting unit 106 determines whether the manufacturing apparatuses D1 to Dk are abnormal using the principal component score acquired in step S305. In this embodiment, an absolute value of the principal component score is compared with a threshold previously set for each principal component. If there is one or more principal component scores higher than the threshold, it is determined that abnormal behaviors have occurred and the process goes to step S307; otherwise the process return to step S304.

(Step S307) The output unit 107 makes an output indicating that the manufacturing apparatuses D1 to Dk have a problem, for example, it displays or sounds an alert. Then, the process is terminated. Note that the process can return to step S304 to continue the process without terminating the process.

(Step S308) The inspected measured-data acceptance unit 104 determines whether a predetermined period of time has elapsed since it started accepting the inspected measured data. If the predetermined period of time has elapsed, it is determined that the processing time is expired and the process is terminated; otherwise, the process returns to step S304.

Figure 3:
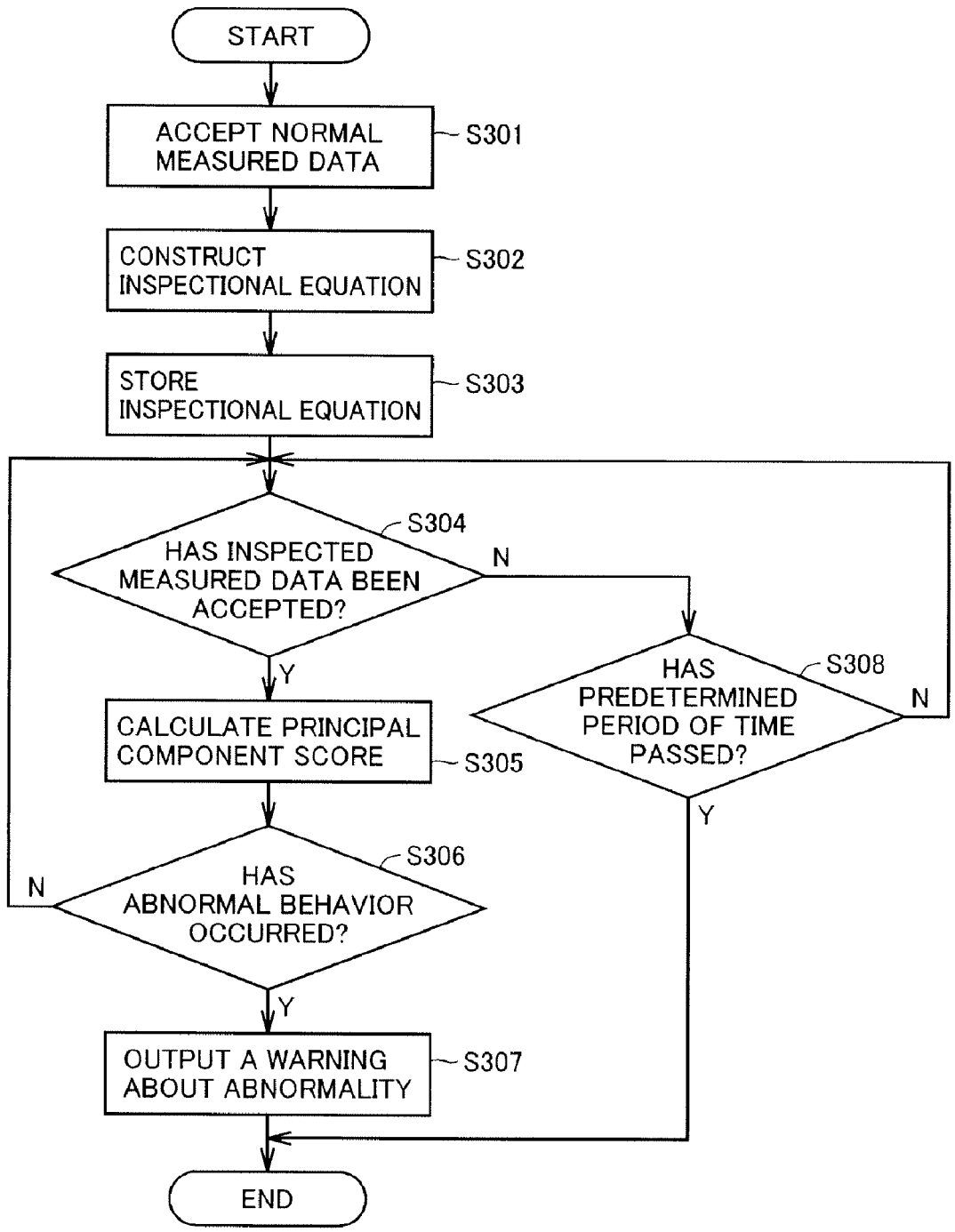
FIG. 3 is a flow chart for illustrating operations of the combine-information processing apparatus.

Although, in the flow chart of FIG. 3, the principal component score calculated from one set of the inspected measured data is compared with the threshold to inspect abnormal behaviors in the manufacturing apparatuses, it is also possible to accept almost sequential multiple sets of the inspected measured data in step S304 and to compare representative values, such as average values, of the principal component scores calculated from each set of inspected measured data in step S305, with the threshold for each principal component. If there is one or more representative values higher than the threshold, it may be determined that the manufacturing apparatuses have a problem.

It is also possible to determine that the manufacturing apparatuses D1 to Dk have a problem when dispersion, more specifically a value of variance, of the plurality of principal component scores calculated for each of the almost sequential multiple sets of inspected measured data, is obtained for each principal component, and the dispersion is higher than the predetermined threshold.

In the flow chart of FIG. 3, the process is terminated by turning off the power source or interruption causing termination of the processes.

A description now will be made about specific operations of the combine-information processing apparatus according to the present embodiment below. The conceptual drawing of the production system including the combine-information processing apparatus is shown in FIG. 1.

In this description, it is defined that the number of the measurement items measured by the intermediate measurement apparatus M is p (p is an integer of 1 or more), while the number of the measurement items measured by the quality measurement apparatus S is q (q is an integer of 1 or more). In addition, these measurement items are correlated with each other.

First, an inspectional equation is constructed. When the manufacturing apparatuses D1 to Dk are in a normal state, the adjustable conditions of the manufacturing apparatuses D1 to Dk are changed in an adjustable range while the manufacturing apparatuses manufacture a plurality of products. The combination of the conditions to be adjusted, designate values for the conditions and so on are preferably determined by computations of a computer or other computing units so that, for example, the difference between the combined conditions is diversified to produce as great dispersion as possible. In addition, it is desirable to automatically control the production line 1000 under the calculated conditions to manufacture the products under the changed adjustable conditions. Such computations and production line control can be made, for example, by the inspectional-equation construction unit 102 of the combine-information processing apparatus 100 or by a controller newly provided in the combine-information processing apparatus 100. In addition, users can manually combine the conditions and control the production operations with the designated conditions. For every product manufactured in the manufacturing process, p intermediate measured data blocks and q screening measured data blocks, both being normal measured data, are measured by the intermediate measurement apparatus M and quality measurement apparatus S, respectively, and then transmitted to the measured-data collection apparatus 50.

In the measured-data collection apparatus 50, normal measured data regarding (p+q) measurement items transmitted from the intermediate measurement apparatus M and quality measurement apparatus S is stored in the measured-data storage unit 52. For example, normal measured data including intermediate measured data and screening measured data measured for one product is stored as one set of normal measured data. The stored multiple sets of normal measured data are transmitted from the measured-data output unit 53 to the combine-information processing apparatus 100.

The normal measured-data acceptance unit 101 of the combine-information processing apparatus 100 accepts the multiple sets of normal measured data transmitted from the measured-data collection apparatus 50. The accepted sets of normal measured data are temporarily stored in a memory or the like.

The inspectional-equation construction unit 102 calculates an inspectional equation using the multiple sets of normal measured data accepted by the normal measured-data acceptance unit 101. Specifically, the sets of normal measured data are standardized for each measurement item. A correlation matrix is calculated using the standardized normal measured data. Then, the calculated correlation matrix is subjected to a principal component analysis to obtain an expression for calculating principal component scores of the principal component.

Now, it is assumed that j (j is an integer from 1 to p) is the rank of the measurement items to be measured by the intermediate measurement apparatus M, while k (k is an integer from 1 to q) is the rank of the measurement items to be measured by the final quality measurement apparatus S. It is also assumed that $c_{mj}$ is an intermediate measurement value regarding the j-th measurement item before standardization, $c'_{mj}$ is an intermediate measurement value regarding the j-th measurement item after standardization, $c_{mjAVE}$ is an average value of the intermediate measurement values regarding the j-th measurement item, and $\sigma_{mj}$ is a standard deviation of the intermediate measurement values regarding the j-th measurement item. In addition, it is assumed that $c_{sk}$ is a screening measurement value regarding the k-th measurement item before standardization, $c'_{sk}$ is a screening measurement value regarding the k-th measurement item after the standardization, $c_{skAVE}$ is an average value of the screening measurement values regarding the k-th measurement item, and $\sigma_{sk}$ is a standard deviation of the screening measurement values regarding the k-th measurement item. Assume that i (i is an integer from 1 to (p+q)) is the rank of the principal components (the order of contribution ratio), and $c_i$ is an expression for calculating the principal component score regarding the i-th principal component. It is assumed that $a_{mji}$ is a coefficient in a term, whose variable is the j-th measurement item of the intermediate measurement value, in an expression for calculating the principal component score regarding the i-th principal component, while $a_{ski}$ is a coefficient in a term, whose variable is the k-th measurement item of the screening measurement value, in an expression for calculating the principal component score regarding the i-th principal component. With these assumptions, the expression C for calculating the principal component score regarding the principal component obtained by the inspectional-equation construction unit 102 is expressed as follows.

$$C = A_m C_m + A_s C_s \quad \text{[Expression 1]}$$

$$C = \begin{pmatrix} c_1 \\ c_2 \\ \vdots \\ c_i \\ \vdots \\ c_n \end{pmatrix}, \quad C_m = \begin{pmatrix} c'_{m1} \\ c'_{m2} \\ \vdots \\ c'_{mj} \\ \vdots \\ c'_{mp} \end{pmatrix}, \quad C_s = \begin{pmatrix} c'_{s1} \\ c'_{s2} \\ \vdots \\ c'_{sk} \\ \vdots \\ c'_{sq} \end{pmatrix},$$

$$A_m = \begin{pmatrix} a_{m11} & a_{m21} & \cdots & a_{mj1} & \cdots & a_{mp1} \\ a_{m12} & a_{m22} & \cdots & a_{mj2} & \cdots & a_{mp2} \\ \vdots & \vdots & \ddots & \vdots & & \vdots \\ a_{m1i} & a_{m2i} & \cdots & a_{mji} & \cdots & a_{mpi} \\ \vdots & \vdots & & \vdots & \ddots & \vdots \\ a_{m1n} & a_{m2n} & \cdots & a_{mjn} & \cdots & a_{mpn} \end{pmatrix},$$

$$A_s = \begin{pmatrix} a_{s11} & a_{s21} & \cdots & a_{sk1} & \cdots & a_{sq1} \\ a_{s12} & a_{s22} & \cdots & a_{sk2} & \cdots & a_{sq2} \\ \vdots & \vdots & \ddots & \vdots & & \vdots \\ a_{s1i} & a_{s2i} & \cdots & a_{ski} & \cdots & a_{sqi} \\ \vdots & \vdots & & \vdots & \ddots & \vdots \\ a_{s1n} & a_{s2n} & \cdots & a_{skn} & \cdots & a_{sqn} \end{pmatrix}$$

$$c_i = a_{m1i} c'_{m1} + a_{m2i} c'_{m2} + \ldots + a_{mjk} c'_{mj} + \ldots + a_{mpi} c'_{mp} + a_{s1i} c'_{s1} + a_{s2i} c'_{s2} + \ldots + a_{ski} c'_{sk} + \ldots + a_{sqi} c'_{sq}$$

$$c'_{mj} = \frac{c_{mj} - c_{mjAVE}}{\sigma_{mj}}, \quad c'_{sk} = \frac{c_{sk} - c_{skAVE}}{\sigma_{sk}}$$

In short, the principal component score regarding the i-th principal component can be obtained by assigning the standardized intermediate measured data and screening measured data into Expression $C_i$ that calculates the i-th principal component score. Instead of standardizing the intermediate measured data and screening measured data, an expression constructed with the intermediate measured data before standardization and screening measured data before standardization, that is, an expression obtained by assigning the Expressions $c'_{mj}$ and $c'_{sk}$ into Expression $C_i$ can be used as the expression for calculating the principal component score.

In this embodiment, among the expressions for calculating the principal component score, expressions for calculating the principal component score of some principal components having low contribution ratios are adapted to be obtained as inspectional equations. To realize this, an example in this embodiment determines the effective upper limit of the contribution ratio as a threshold in advance, and acquires expressions for calculating the principal component score of the principal components whose contribution ratios are equal or less than the threshold as inspectional equations.

In order to avoid the use of measured data on the measurement items contributing less to determination of abnormal manufacturing apparatuses D1 to Dk, another expression is obtained as an inspectional equation among the above-described expressions for calculating each principal component score. For example, when the magnitude of a coefficient in each term contained in an expression for calculating the principal component score obtained through a principal component analysis is smaller than a predetermined threshold, an expression for calculating the principal component score with the coefficient set to 0, in other words, an expression for calculating the principal component score with the term containing the coefficient removed is acquired as an inspectional equation. The acquired inspectional equation is then stored in the inspectional equation storage unit 103. The threshold can be set based on, for example, results from experiments and simulations.

After the acquisition of the inspectional equations, the manufacturing apparatuses, with the adjustable conditions set to regular conditions for manufacturing products, conducts regular manufacturing processes. Then, intermediate measured data and screening measured data, which are inspected measured data measured during regular manufacturing processes, are obtained by the intermediate measurement apparatus M and quality measurement apparatus S, respectively, to transmit the data to the measured-data collection apparatus 50. The intermediate measured data and screening measured data that are not utilized in the inspectional equation are not required and therefore acquisition of the data can be omitted.

In the measured-data collection apparatus 50, the inspected measured data on (p+q) measurement items transmitted from the intermediate measurement apparatus M and quality measurement apparatus S are stored in the measured-data storage unit 52. For example, the inspected measured data including intermediate measured data and screening measured data regarding a single product is temporarily stored as one set of the inspected measured data. Then, the sets of stored inspected measured data are successively transmitted in order of storage from the measured-data output unit 53 to the combine-information processing apparatus 100. Note that the intermediate measured data and screening measured data that are not utilized in the inspectional equations do not need to be collected. Alternatively, the intermediate measured data and screening measured data that are not utilized in the inspectional equations can be set not to be transmitted to the combine-information processing apparatus 100.

The inspected measured-data acceptance unit 104 of the combine-information processing apparatus 100 accepts in sequence the sets of inspected measured data transmitted from the measured-data collection apparatus 50. The accepted sets of inspected measured data are temporarily stored in a memory or the like.

The inspectional-equation construction unit 102 calculates a principal component score of each of the above-described principal components using the inspected measured data accepted by the inspected measured-data acceptance unit 104 with the inspectional equations stored in the inspectional equation storage unit 103. More specifically, the intermediate measured data before standardization $c_{mj}$ and screening measured data before standardization $c_{sj}$ of each set of the inspected measured data accepted by the inspected measured-data acceptance unit 104 and the average value $c_{mjAVE}$ of the intermediate measured data, average value $c_{mjAVE}$ of the screening measured data, standard deviation $\sigma_{mj}$ of the intermediate measured data and standard deviation $\sigma_{sj}$ of the screening measured data, which are obtained using $c_{mj}$ and $c_{sj}$, are assigned into the expression constructed by assigning Expressions $c'_{mj}$ and $C'_{sk}$ into Expression $C_i$ for calculating the i-th principal component score to obtain a principal component score of a principal component having high contribution ratios.

With the use of the obtained principal component score, the manufacturing apparatuses D1 to Dk are inspected. Now, a description will be made about the inspecting process in the embodiment. For the sake of simplifying the description, an example case where the manufacturing apparatuses are inspected using the principal component score calculated using two correlated inspected measured data blocks including an intermediate measured data block $C_m$ and a screening measured data block $C_s$ will be described.

Figure 4:
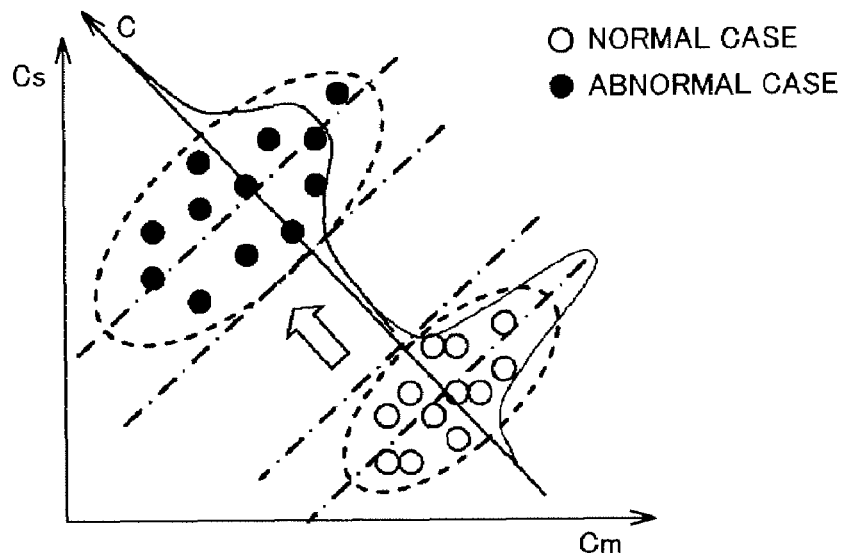
FIG. 4 is a graph for illustrating an operation of the combine-information processing apparatus.
Figure 7:
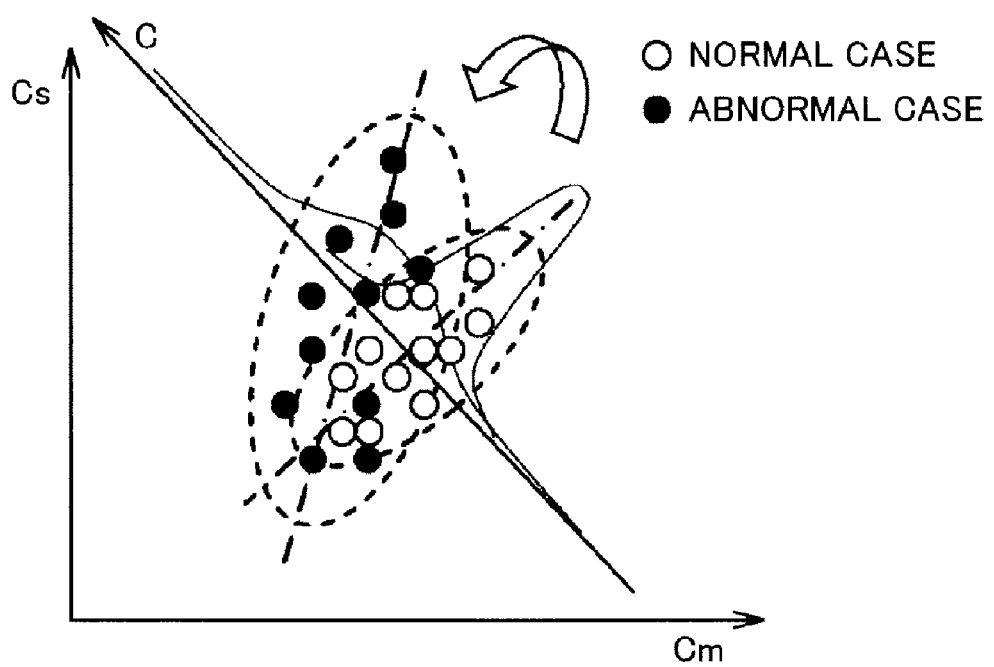
FIG. 7 is a graph for illustrating an operation of the combine-information processing apparatus.

FIGS. 4 and 7 are graphs with the intermediate measured data $C_m$ and screening measured data $C_s$, which are the inspected measured data, plotted on the horizontal axis and vertical axis, respectively. Straight line c represents an expression for calculating the principal component score regarding the principal component having low contribution ratios (hereinafter referred to as a "second principal component") calculated using the intermediate measured data $C_m$ and screening measured data $C_s$ of the same normal measured data.

At the measurement of the normal measured data, the manufacturing apparatuses D1 to Dk in a normal state perform manufacturing, treatment or machining processes on products as having the adjustable conditions thereof greatly changed. Then, an expression for calculating the principal component score is obtained using the measured normal measured data as described above. In this embodiment in which the two measured data blocks are present, expressions for calculating the principal component score are obtained in terms of the principal component having a high contribution ratio (hereinafter referred to as a "first principal component") and the second principal component having a low contribution ratio. Since the normal measured data is measured data obtained after the adjustment of the conditions of the manufacturing apparatuses D1 to Dk, the first principal component is a principal component in the direction in which the dispersion of measured data caused by the adjustment of the manufacturing apparatuses D1 to Dk is spread out. If the manufacturing apparatuses D1 to Dk are normal, it is assumed that the measured data obtained after the adjustment of the conditions of the manufacturing apparatuses D1 to Dk could be distributed along the axis in the direction of the principal component. On the other hand, the second principal component is not correlated with the first principal component and is less affected by the dispersion of the measured data caused by the adjustment of manufacturing apparatuses D1 to Dk, in other words, the second principal component can ignore the factor affected by the adjustment made to the manufacturing apparatuses D1 to Dk. Thus, among the expressions for calculating the principal component scores using the normal measured data, the use of the expression for calculating the principal component score of the principal component having a low contribution ratio as an inspectional equation, in other words, the use of the straight line c as an inspectional equation makes it possible to inspect measured data variations caused by factors other than the factor associated with the adjustment to the manufacturing apparatuses D1 to Dk, because the factor associated with the adjustment to the manufacturing apparatuses D1 to Dk is negligible.

Next, a consideration will be given to a case where the inspected measured data is obtained while the manufacturing apparatuses D1 to Dk perform manufacturing, treatment or machining processes on products. For the purpose of improving the screening ratio of products, the adjustable conditions of the manufacturing apparatuses D1 to Dk are properly adjusted to manufacture the products. If there is no problem in the manufacturing apparatuses D1 to Dk, the correlation between the intermediate measured data $C_m$ and screening measured data $C_s$, which are the inspected measured data, is regarded as being stable, and therefore a main variation factor in the inspected measured data is considered to be the adjustment made to the manufacturing apparatuses D1 to Dk. Specifically, it is considered that the inspected measured data is shifted only in the direction of the first principal component in the principal components obtained using the normal measured data, that is, in the direction almost perpendicular to the straight line c, as shown by "normal case" in FIG. 4.

Next, a consideration will be given to a case where abnormal behaviors occur in the manufacturing apparatuses D1 to Dk, more specifically a case where a plurality of inspected measured data blocks changes abruptly due to a common abnormal cause found in processes, performed by the manufacturing apparatuses D1 to Dk, before and after the intermediate measurement apparatus M. The occurrence of the abnormal behaviors creates variations that produce an offset component in directions other than the direction affected by the adjustment made to the manufacturing apparatuses. In other words, an offset component is generated in the direction of the second principal component, which is a different direction from the first principal component, thereby shifting the inspected measured data toward the second principal component. As a result, the inspected measured data shifts, as shown by "abnormal case" in FIG. 4, so as to move in parallel on the second principal component represented by the straight line c, for example.

Accordingly, by setting a threshold for the principal component score of the second principal component, it can be determined that manufacturing apparatuses D1 to Dk have problems when the magnitude (absolute value) of the principal component score obtained by assigning the inspected measured data into the expression for calculating the principal component score of the second principal component is greater than the threshold. The threshold is set based on the results from experiments or simulations performed with abnormal manufacturing apparatuses D1 to Dk.

Figure 5:
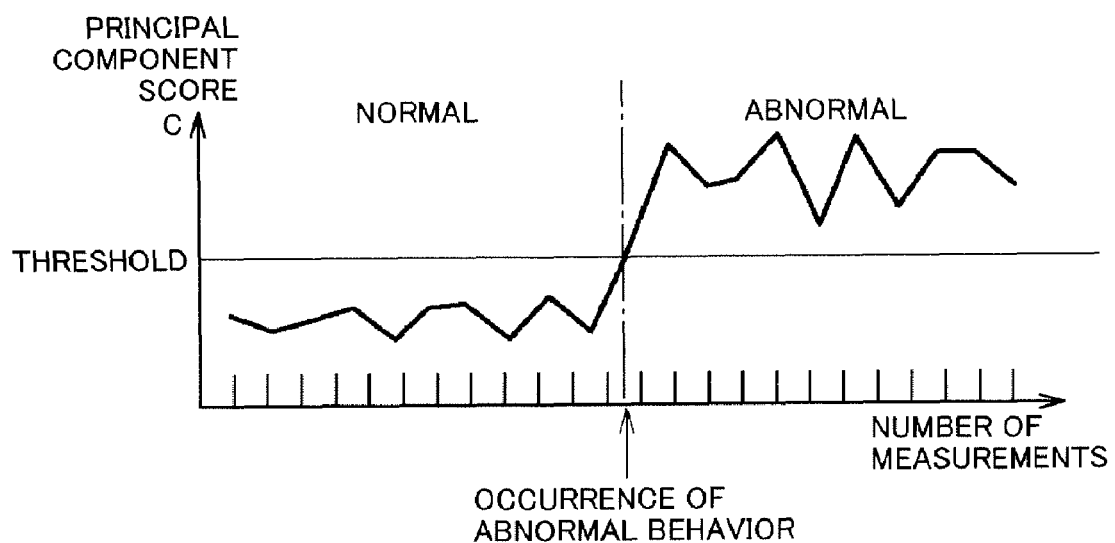
FIG. 5 is a graph for illustrating an operation of the combine-information processing apparatus.

As shown in FIG. 5, for example, the occurrence of abnormal behaviors can be determined by inspecting the second principal component score beyond the threshold. In FIG. 5, the horizontal axis represents the number of measurements performed to obtain the inspected measured data, while the vertical axis represents the principal component score.

The calculation of the principal component scores can be made by, without individually assigning the inspected measured data to the inspectional equation, assigning a representative value, such as an average value, of the inspected measured data measured within a constant or inconstant predetermined period of time into the inspectional equation to calculate the principal component scores used for inspecting.

Instead of the comparison process between the principal component scores and threshold as described above, or in addition to the comparison process, the inspecting operation can be also performed through the following process.

Figure 8:
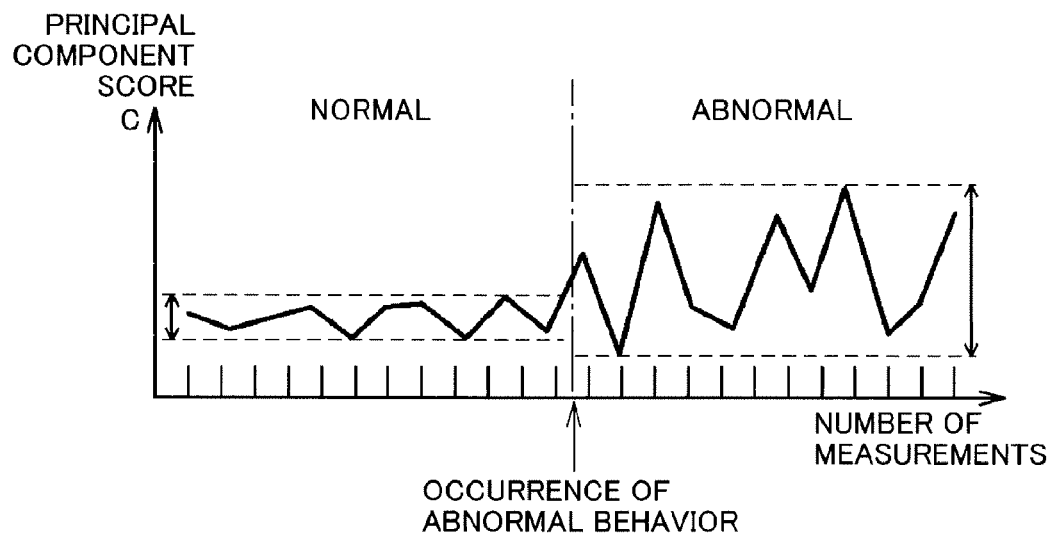
FIG. 8 is a graph for illustrating an operation of the combine-information processing apparatus.

Suppose the cause of abnormal behaviors is found in the process after the intermediate measurement apparatus M, an offset component is generated in the direction other than the direction affected by the adjustment made to the manufacturing apparatus, in other words, in the direction of the second principal component and great variations in the intermediate measured data $C_m$ and screening measured data $C_s$ of the inspected measured data can be made according to the adjustment amount for the manufacturing apparatuses, like the gap between the intermediate measured data $C_m$ and screening measured data $C_s$ widened and narrowed more than expected. Because of this, it is found that the dispersion of the inspected measured data, as shown by "abnormal case" in FIG. 7, in the direction of the second principal component when the abnormal behaviors occurred is greater than the dispersion of the inspected measured data, as shown by "normal case" in FIG. 7, in the direction of the second principal component when the manufacturing apparatuses D1 to Dk are normal. For example, as shown in FIG. 8, the variations of the second principal component scores obtained from the inspected measured data reveal that the second principal component scores after the occurrence of the abnormal behaviors swing widely. In FIG. 8, the horizontal axis represents the number of the measurements performed to obtain the inspected measured data, while the vertical axis represents the principal component score.

Accordingly, by setting a threshold for values indicating dispersion of the principal component scores of the second principal component, for example, for variance values in advance, it can be determined that the manufacturing apparatuses D1 to Dk have a problem when the variance of the principal component scores obtained by assigning the inspected measured data within a constant or inconstant predetermined period of time into the expressions for calculating the principal component scores of the second principal component is greater than the threshold. The above-described threshold is set based on the results from experiments or simulations performed with abnormal manufacturing apparatuses D1 to Dk.

There are two normal measured data blocks and two inspected measured data blocks in this embodiment as an example; however, even if there are three normal measured data blocks and three inspected measured data blocks or more, the manufacturing apparatuses D1 to Dk can be determined whether being abnormal or not by, as with the above case, inspecting the manufacturing apparatuses with the principal component scores of one or more principal components having low contribution ratios among the expressions for calculating the principal component scores using the normal measured data to eliminate the effect of factors associated with the adjustment made to the manufacturing apparatuses D1 to Dk.

In short, the inspecting unit 106 performs the inspecting operation, involving the calculation of the variance of the principal component scores, on the principal component scores calculated by the principal-component-score calculation unit 105 through all expressions included in the inspectional equations.

Figure 6:
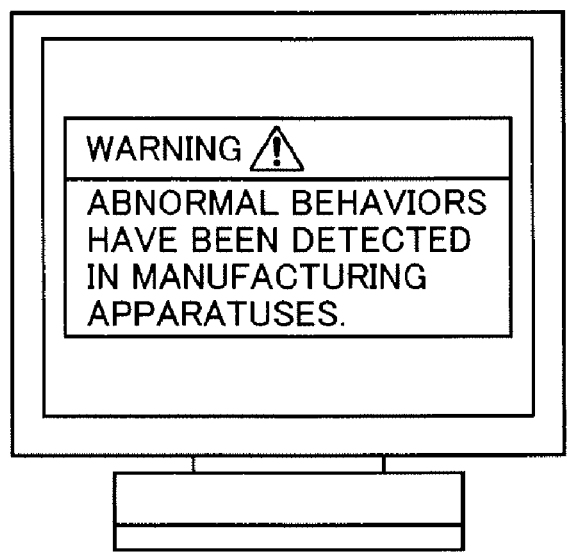
FIG. 6 illustrates an exemplary display of the combine-information processing apparatus.

When the inspecting unit 106 determines that one or more abnormal behaviors have occurred through the above process, the output unit 107 makes an output indicating that the abnormal behaviors have occurred in the manufacturing apparatuses D1 to Dk, for example, by sounding an alert or displaying an alert as shown in FIG. 6.

According to the embodiment, which obtains expressions for calculating principal component scores through a principal component analysis using the normal measured data obtained from the manufacturing apparatuses D1 to Dk whose adjustable conditions are adjusted in advance and acquiring expressions, among the above expressions, for calculating the principal component scores of principal components having low contribution ratios as inspectional equations, the variations caused by the adjustment do not greatly contribute to the principal component scores. Therefore, the measured data variations are inspected using the principal component scores contributed less by the variations caused by the adjustment made to the manufacturing apparatuses D1 to Dk. This enables determination of whether abnormal behaviors have occurred in the manufacturing apparatuses D1 to Dk without being influenced by the variations in the measured data caused by the adjustment made to the manufacturing apparatuses D1 to Dk.

In other words, the factor associated with the adjustment made to the manufacturing apparatuses D1 to Dk is removed from factors used to determine whether the manufacturing apparatuses are abnormal. Even if abnormal measured data is obtained due to, for example, adjustment errors made to the manufacturing apparatuses D1 to Dk, the manufacturing apparatuses D1 to Dk are not determined abnormal. Because, in consideration of the variations in the measured data or other data obtained from the manufacturing apparatuses D1 to Dk whose conditions are adjusted, the manufacturing apparatuses D1 to Dk are properly determined abnormal or not.

Suppose an inspecting operation is performed using, for example, distributions of individual measured value, such as the intermediate measured data $C_m$ and screening measured data $C_s$, for the purpose of detecting the manufacturing apparatuses' abnormality in the above-described example, such an inspecting operation may cause the distributions of the individual measurement values obtained at normal time and abnormal time to overlap and may provide a difficulty in recognizing the changes in the spread distributions between the normal time and abnormal time, and therefore accurate determination of the apparatuses' abnormality may be impossible.

Figure 9:
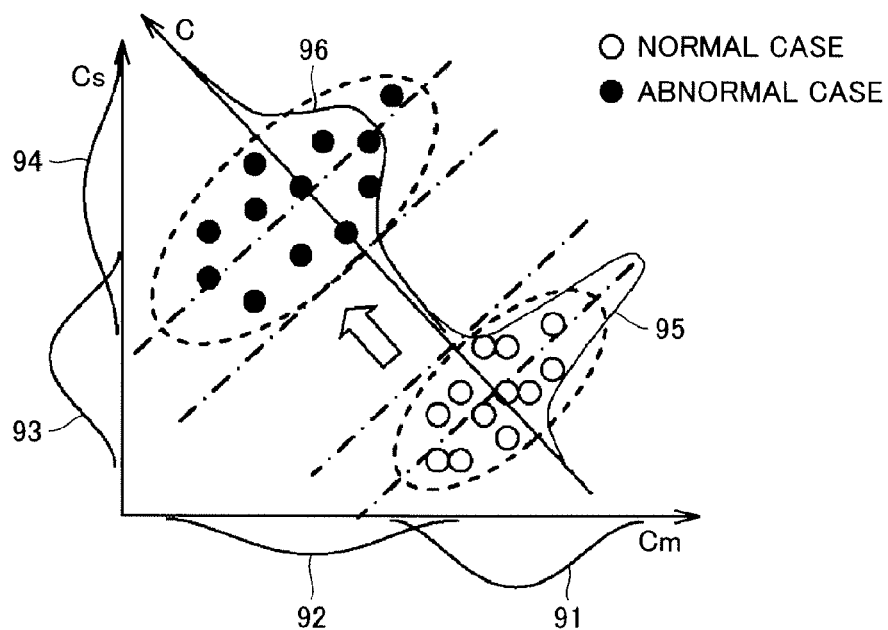
FIG. 9 is a graph for illustrating an operation of the combine-information processing apparatus.

For example, in a case where the measurement values are distributed as shown in FIG. 4, distribution 91 of values of the intermediate measured data $C_m$ at normal time and distribution 92 of values of the intermediate measured data $C_m$ at abnormal time partially overlap one another as shown in FIG. 9. Ditto for distribution 93 of values of the screening measured data $C_s$ at normal time and distribution 94 of values of the screening measured data $C_s$ at abnormal time. The largely overlapping distributions make it difficult to accurately determine the apparatuses' abnormality based on the changes of the distributed positions of the intermediate measured data $C_m$ and screening measured data $C_s$. However, as shown in distributions of the principal component scores, obtained in the present embodiment, in terms of the same measured data, overlapping area between the distribution 95 at normal time and distribution 96 at abnormal time is smaller than that between the distributions of the individual measured data. Consequently, inspecting the apparatuses' abnormality through the changes in the distributed position of the principal component scores enables accurate determination of whether the manufacturing apparatuses are abnormal.

Figure 10:
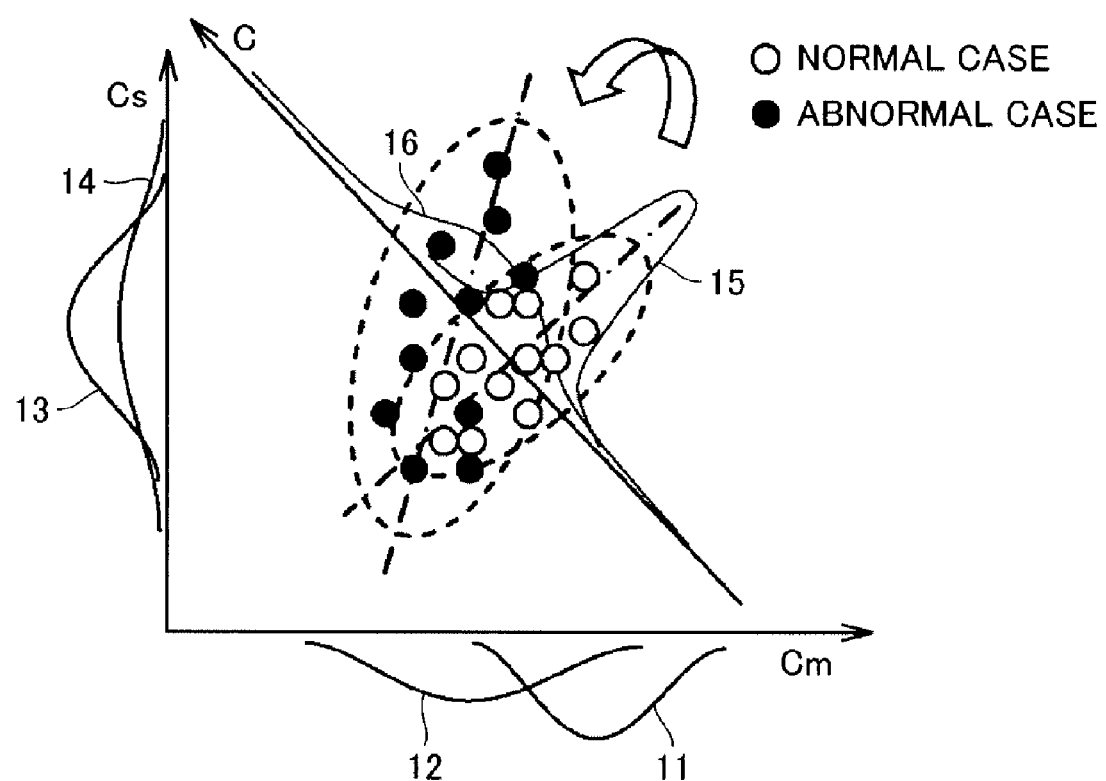
FIG. 10 is a graph for illustrating an operation of the combine-information processing apparatus.

In a case where the measurement values are distributed as shown in FIG. 7, the difference in spread (width) between distribution 11 of values of the intermediate measured data $C_m$ at normal time and distribution 12 of values of the intermediate measured data $C_m$ at abnormal time becomes small as shown in FIG. 10. Ditto for distribution 13 of values of the screening measured data $C_s$ at normal time and distribution 14 of values of the screening measured data $C_s$ at abnormal time. It is difficult to accurately determine the apparatuses' abnormality based on the changes in the distribution spread of the intermediate measured data $C_m$ and screening measured data $C_s$ since the difference in spread of the distributions is so small. However, as shown in distributions of the principal component scores obtained in the present embodiment, the difference in the spread between distribution 15 at normal time and distribution 16 at abnormal time is greater than the difference in the spread of distributions of individual measured data. Consequently, inspecting the apparatuses' abnormality through the changes in width of the distributions of the principal component scores enables accurate determination of whether the manufacturing apparatuses are abnormal.

Although one or more intermediate measured data blocks and one or more final measured data blocks, which are correlated with each other, are used in the above-described specific example, the embodiment can be also achieved through the use of two or more correlated intermediate measured data blocks alone or two or more correlated screening measured data blocks alone.

In addition, the embodiment can be also achieved with even only one manufacturing apparatus in the production line 1000.

Instead of the intermediate measurement apparatus M and quality measurement apparatus S, any other apparatuses can obtain the measured data in the embodiment as long as the apparatuses can acquire two or more correlating measured data blocks. The number of the apparatuses to acquire the measured data is not limited. The apparatus to acquire the measured data may be comprised of, for example, an intermediate measurement apparatus M, a second intermediate measurement apparatus and a third intermediate measurement apparatus. Note that the manufacturing apparatus in which its abnormality can be detected according to the present embodiment is limited to the manufacturing apparatus performing a process before the measurement operation performed by either one of the measurement apparatuses.

In addition to the inspecting operation using one or more intermediate measured data blocks and one or more final measured data blocks, which are correlated with each other, it is possible to simultaneously perform an inspecting operation for detecting abnormalities using two or more correlated intermediate measured data blocks or two or more correlated screening measured data blocks in the same manner as above. Even if the inspected measured data including the intermediate measured data and final measured data is plotted, upon the occurrence of abnormal behaviors, so as to accidentally shift in the same direction as the direction of the principal component having high contribution ratios, the simultaneous execution of the inspecting operation can be implemented using either of the intermediate measured data and screening measured data to detect abnormality as described above, thereby increasing possibility of determining the apparatuses' abnormality and therefore reliably improving determination performance.

In the embodiment, the inspectional-equation construction unit 102 and other units of the combine-information processing apparatus 100 acquire inspectional equations from normal measured data; however, the normal measured-data acceptance unit 101, inspectional-equation construction unit 102 and other units of the combine-information processing apparatus 100 can be omitted. In this case, the inspectional equations are acquired by an apparatus or apparatuses that are provided outside the combine-information processing apparatus 100 and have the same functions as the normal measured-data acceptance unit 101, inspectional-equation construction unit 102 and other units, and accepted through an acceptance unit (not shown) of the combine-information processing apparatus 100 to be stored in the inspectional equation storage unit 103.

The structure of the measured-data collection apparatus 50 in the above embodiment can be incorporated in the combine-information processing apparatus 100 to omit the actual measured-data collection apparatus 50.

In the above embodiments, the individual processes (functions) may be centralized and performed by a single apparatus (system), or they may be distributed to a plurality of apparatuses.

Each element in the above embodiments may be special hardware, but some of the elements are implementable by software that realizes the embodiments by running a program. For example, a software program stored in a record medium such as a hard disk and semiconductor memory is read out and executed by a program executing unit such as a CPU, thereby realizing the elements.

The software that provides the combine-information processing apparatus according to the embodiments is the following program. The program permits a computer to perform: an inspected measured-data acceptance step of accepting inspected measured data that is measured data regarding a plurality of measuring objects processed by a manufacturing apparatus in terms of measurement items corresponding to terms contained in an inspectional equation stored in an inspectional equation storage unit, the inspectional equation calculating one or more principal component scores and obtained by performing a principal component analysis on normal measured data, the normal measured data being measured data regarding a plurality of measuring objects, that are processed by the manufacturing apparatus whose adjustable conditions are changed while the manufacturing apparatus is in a normal state, in terms of two or more correlated measurement items; a principal-component-score calculation step of calculating the principal component scores using the inspected measured data accepted in the inspected measured-data acceptance step with the inspectional equation; an inspecting step of inspecting the state of the manufacturing apparatus using the principal component scores calculated in the principal-component-score calculation step; and an output step of outputting inspecting results obtained in the inspecting step.

Additionally, the program further permits a computer to perform: a normal measured-data acceptance step of accepting normal measured data that is measured data regarding a plurality of measuring objects in terms of two or more correlated measurement items, the plurality of measuring objects being processed by a manufacturing apparatus whose adjustable conditions are changed while the manufacturing apparatus is in a normal state; and an inspectional equation acquisition step of acquiring the inspectional equation for calculating the one or more principal component scores and storing the inspectional equation in the inspectional equation storage unit, the inspectional equation being obtained by performing a principal component analysis on the normal measured data accepted in the normal measured-data acceptance step.

The information transmission step and the information reception step in the program do not include processes performed by hardware, such as processes performed using a modem or an interface card in the transmission step (processes performed only by hardware).

In addition, the program can be downloaded from a server or the like or read out from a certain recording medium (for example, optical disc such as CD-ROM, magnetic disc and semiconductor memory) on which the program is stored.

A single computer or multiple computers may be employed to perform the program of the invention. That is, centralized processing, or distributed processing may be performed.

Further, in the embodiment, two or more communication means, such as data transmitters, present in one apparatus may be physically provided by a single medium.

The present invention is not limited to the above described embodiments and can be variously modified, and these modifications are also included within the technical scope of the present invention.

The combine-information processing apparatus is a stand-alone apparatus in the embodiments; however, the combine-information processing apparatus can be either a stand-alone apparatus or a server apparatus in a client-server system. In the later case, the output unit and acceptance unit outputs images and accepts an input via a communication line, respectively.

As described above, the combine-information processing apparatus according to the present invention is adaptable as an apparatus for determining the occurrence on abnormal behaviors in the manufacturing apparatuses using measurement values of a plurality of items and is a useful manufacturing apparatus for determining the occurrence of abnormal behaviors in consideration of the measured data variations caused by adjustment.

What is claimed is:

1. A combine-information processing apparatus comprising:
   an inspectional equation storage unit in which an inspectional equation for calculating one or more principal component scores can be stored, said inspectional equation being obtained by performing a principal component analysis on normal measured data that is measured data regarding a plurality of measuring objects in terms of two or more correlated measurement items, and said plurality of measuring objects being processed by a manufacturing apparatus whose adjustable conditions are changed while said manufacturing apparatus is in a normal state;
   an inspected measured-data acceptance unit for accepting inspected measured data that is measured data regarding the measuring objects processed by said manufacturing apparatus in terms of the measurement items corresponding to each term contained in said inspectional equation;
   a principal-component-score calculation unit for calculating the principal component scores using the inspected measured data, accepted by said inspected measured-data acceptance unit, with said inspectional equation;
   an inspecting unit for inspecting the state of said manufacturing apparatus using the principal component scores calculated by said principal-component-score calculation unit; and an output unit for outputting inspecting results obtained by said inspecting unit.

2. The combine-information processing apparatus according to claim 1, wherein
said inspecting unit determines that said manufacturing apparatus is abnormal when the principal component scores calculated by said principal-component-score calculation unit are greater than a predetermined threshold, and
said output unit outputs inspecting results indicating the manufacturing apparatus' abnormality determined by said inspecting unit.

3. The combine-information processing apparatus according to claim 1, wherein
said inspected measured-data acceptance unit accepts a plurality of inspected measured data blocks obtained by measuring a plurality of measuring objects,
said principal-component-score calculation unit calculates a plurality of principal component scores associated with said plurality of inspected measured data blocks using said plurality of inspected measured data blocks accepted by said inspected measured-data acceptance unit with said inspectional equation,
said inspecting unit determines that said manufacturing apparatus is abnormal when a representative value of the plurality of principal component scores calculated by said principal-component-score calculation unit is greater than a predetermined threshold, and
said output unit outputs inspecting results indicating the manufacturing apparatus' abnormality determined by said inspecting unit.

4. The combine-information processing apparatus according to claim 1, wherein
said inspected measured-data acceptance unit accepts a plurality of inspected measured data blocks obtained by measuring a plurality of measuring objects,
said principal-component-score calculation unit calculates a plurality of principal component scores associated with said plurality of inspected measured data blocks using said plurality of inspected measured data blocks accepted by said inspected measured-data acceptance unit with said inspectional equation,
said inspecting unit determines that said manufacturing apparatus is abnormal when a value of dispersion of the plurality of principal component scores calculated by said principal-component-score calculation unit is greater than a predetermined threshold, and
said output unit outputs inspecting results indicating the manufacturing apparatus' abnormality determined by said inspecting unit.

5. The combine-information processing apparatus according to claim 1 further comprising:
a normal measured-data acceptance unit for accepting normal measured data that is measured data regarding a plurality of measuring objects in terms of two or more correlated measurement items, and said plurality of measuring objects being processed by a manufacturing apparatus whose adjustable conditions are changed while said manufacturing apparatus is in a normal state; and
an inspectional equation acquisition unit for acquiring said inspectional equation for calculating one or more principal component scores and storing said inspectional equation in said inspectional equation storage unit, and said inspectional equation being obtained by performing a principal component analysis on said normal measured data accepted by said normal measured-data acceptance unit.

6. The combine-information processing apparatus according to claim 1, wherein
among expressions that calculate the principal component scores and are obtained by performing a principal component analysis on said normal measured data, said inspectional equation that can be stored in said inspectional equation storage unit is an inspectional equation for calculating the principal component scores in the ascending order of contribution ratio.

7. The combine-information processing apparatus according to claim 1, wherein
among expressions that calculate the principal component scores and are obtained by performing a principal component analysis on said normal measured data, said inspectional equation that can be stored in said inspectional equation storage unit at least includes an expression for calculating the principal component scores of a principal component having the lowest contribution ratio.

8. The combine-information processing apparatus according to claim 1, wherein
when the magnitude of coefficients in each term contained in the expression for calculating the principal component scores obtained through said principal component analysis is smaller than a predetermined threshold, said inspectional equation that can be stored in said inspectional equation storage unit is an expression for calculating principal component scores with its coefficients set to 0.

9. A computer-implemented method for processing combine-information comprising:
an inspected measured-data acceptance step of accepting inspected measured data that is measured data regarding a plurality of measuring objects processed by a manufacturing apparatus in terms of measurement items corresponding to terms contained in an inspectional equation stored in an inspectional equation storage unit, said inspectional equation calculating one or more principal component scores and obtained by performing a principal component analysis on normal measured data, said normal measured data being measured data regarding a plurality of measuring objects, that are processed by said manufacturing apparatus whose adjustable conditions are changed while said manufacturing apparatus is in a normal state, in terms of two or more correlated measurement items;
a principal-component-score calculation, by one or more computers, step of calculating the principal component scores using the inspected measured data accepted in said inspected measured-data acceptance step with said inspectional equation;
an inspecting step of inspecting the state of said manufacturing apparatus using the principal component scores calculated in said principal-component-score calculation step; and
an output step of outputting, by one or more computers, inspecting results obtained in said inspecting step.

10. The computer-readable method for processing combine-information according to claim 9, further comprising:
a normal measured-data acceptance step of accepting normal measured data that is measured data regarding a plurality of measuring objects in terms of two or more correlated measurement items, said plurality of measuring objects being processed by a manufacturing apparatus whose adjustable conditions are changed while said manufacturing apparatus is in a normal state; and an inspectional equation acquisition step of acquiring said inspectional equation for calculating the one or more principal component scores and storing said inspectional equation in said inspectional equation storage unit, said inspectional equation being obtained by performing a principal component analysis on said normal measured data accepted in said normal measured-data acceptance step.

11. A computer-readable medium in which a program executable by a computer is recorded to perform:

an inspected measured-data acceptance step of accepting inspected measured data that is measured data regarding a plurality of measuring objects processed by a manufacturing apparatus in terms of measurement items corresponding to terms contained in an inspectional equation stored in an inspectional equation storage unit, said inspectional equation calculating one or more principal component scores and obtained by performing a principal component analysis on normal measured data, said normal measured data being measured data regarding a plurality of measuring objects, that are processed by said manufacturing apparatus whose adjustable conditions are changed while said manufacturing apparatus is in a normal state, in terms of two or more correlated measurement items;

a principal-component-score calculation step of calculating the principal component scores using the inspected measured data accepted in said inspected measured-data acceptance step with said inspectional equation;

an inspecting step of inspecting the state of said manufacturing apparatus using the principal component scores calculated in said principal-component-score calculation step; and an output step of outputting inspecting results obtained in said inspecting step.

12. The computer-readable medium, according to claim 11, in which a program executable by a computer is recorded to perform:

a normal measured-data acceptance step of accepting normal measured data that is measured data regarding a plurality of measuring objects in terms of two or more correlated measurement items, said plurality of measuring objects being processed by a manufacturing apparatus whose adjustable conditions are changed while said manufacturing apparatus is in a normal state; and an inspectional equation acquisition step of acquiring said inspectional equation for calculating the one or more principal component scores and storing said inspectional equation in said inspectional equation storage unit, said inspectional equation being obtained by performing a principal component analysis on said normal measured data accepted in said normal measured-data acceptance step.

* * * * *